(12) United States Patent
Garcia

(10) Patent No.: US 12,190,130 B2
(45) Date of Patent: Jan. 7, 2025

(54) EVALUATION OF WEB REQUESTS WITH AN EXTERNAL SOURCE OF INFORMATION BY BROWSER EXTENSIONS USING AN INTERNAL GATEWAY PAGE

(71) Applicant: Fortinet, Inc., Sunnyvale, CA (US)

(72) Inventor: Karel Chanivecky Garcia, Surrey (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 18/216,905

(22) Filed: Jun. 30, 2023

(65) Prior Publication Data

US 2024/0330017 A1 Oct. 3, 2024

Related U.S. Application Data

(63) Continuation-in-part of application No. 18/129,051, filed on Mar. 30, 2023.

(51) Int. Cl.
*G06F 9/445* (2018.01)
*H04L 67/02* (2022.01)
*G06F 16/955* (2019.01)

(52) U.S. Cl.
CPC .......... *G06F 9/44526* (2013.01); *H04L 67/02* (2013.01); *G06F 16/955* (2019.01)

(58) Field of Classification Search
CPC ............. G06F 9/44526; G06F 9/44521; G06F 16/955; H04L 67/02
USPC ........................................................ 709/224
See application file for complete search history.

(56) References Cited

U.S. PATENT DOCUMENTS

| | | | | |
|---|---|---|---|---|
| 7,493,414 B2* | 2/2009 | Tazuma | ............... | G06F 16/9574 709/239 |
| 7,680,954 B2* | 3/2010 | Zhang | ................. | H04L 61/4511 709/245 |
| 8,601,586 B1* | 12/2013 | Boutros | ............... | H04L 63/1433 709/224 |
| 10,785,131 B2* | 9/2020 | Saha | .................... | H04L 67/1034 |
| 11,188,941 B2* | 11/2021 | Vandusen | ........... | G06Q 30/0255 |
| 2002/0124049 A1* | 9/2002 | Gorodetsky | ............ | H04L 67/55 709/227 |
| 2016/0127208 A1* | 5/2016 | Saha | .................... | H04L 43/0876 709/224 |

(Continued)

*Primary Examiner* — Sargon N Nano
(74) *Attorney, Agent, or Firm* — Law Office of Dorian Cartwright; Dorian Cartwright

(57) ABSTRACT

A web request to the web browser is intercepted by the web browser extension to determine whether information is synchronously available to evaluate the web request. Responsive to not having information for synchronous evaluation, the web request is redirected to display a gateway page while asynchronous obtaining information from an external information provider server, the request tracked with a request identifier and storing the asynchronously gathered information for synchronous access along with the request identifier. Responsive to an automated notification from the web browser extension, the web request is reissued to the web browser by the gateway page to replace the gateway page with response content from the web request. The reissued web request is again intercepted by the web browser extension to synchronously evaluate the gathered information. The reissued web request is then based on the fetched.

10 Claims, 10 Drawing Sheets

(56) References Cited

U.S. PATENT DOCUMENTS

| | | | |
|---|---|---|---|
| 2016/0142434 A1* | 5/2016 | Simpson | G06F 21/577 |
| | | | 726/1 |
| 2016/0316033 A1* | 10/2016 | Wang | H04L 67/146 |
| 2019/0081874 A1* | 3/2019 | Saha | H04L 43/0817 |
| 2020/0267172 A1* | 8/2020 | Still | G06N 20/00 |
| 2023/0367833 A1* | 11/2023 | Kol | H04L 63/0227 |
| 2024/0265057 A1* | 8/2024 | Kol | H04L 67/59 |

\* cited by examiner

EVALUATION OF WEB REQUESTS WITH AN EXTERNAL SOURCE OF INFORMATION BY BROWSER EXTENSIONS USING AN INTERNAL GATEWAY PAGE

CROSS-REFERENCE TO RELATED APPLICATIONS

The present invention claims priority as a continuation-in-part under 35 USC 120 (a) to U.S. application Ser. No. 18/129,051, filed Mar. 30, 2023, by Karel Chanivecky Garcia, the contents of which are incorporated herein in its entirety.

FIELD OF THE INVENTION

The invention relates generally to computer networks, and more specifically, for a web browser having a web browser extension for evaluating web requests using internal coordination to make asynchronous information synchronously available, prior to dispatching the web requests.

BACKGROUND

To perform evaluation of web requests, web browser extensions typically depend on the webRequest API. However, major browsers available in Windows such as Chrome and Edge require the use of the webRequest API to be synchronous, with the exception of Firefox. To expand, when a request is being dispatched, an event handler is notified. The event handler must return an object specifying whether to allow, block, or redirect the request. The event handler is not allowed to return a JS Promise (Except Firefox). For this reason, to evaluate the action to take for a certain request, a web browser extension can only depend on information that is immediately available. One solution previously applied by extensions was the use of XMLHttpRequest in sync mode. This would cause the event handler to block until the HTTP request is fulfilled or an error occurs. Hence, the extension was able to meet the requirement of providing a resolution synchronously. However, with the deprecation of synchronous XMLHttpRequest no viable options remain available for extension to query a 3rd-party for information about a request, as this is now intrinsically asynchronous.

Reliance upon a third-party service, for a parking service, is problematic with respect to real-time information gathering because the parking service is not always available or efficient.

What is needed is a robust technique for evaluating web requests in an extension of a web browser having an extension for evaluating web requests using internal coordination to make asynchronous information synchronously available, prior to dispatching the web requests. A web request can be redirected to a gateway page while information is asynchronously gathered.

SUMMARY

To meet the above-described needs, methods, computer program products, and systems for a web browser having a web browser extension for evaluating web requests using internal coordination to make asynchronous information synchronously available, prior to dispatching the web requests.

In one embodiment, a web request to the web browser is intercepted by the web browser extension to determine whether information is synchronously available to evaluate the web request. Responsive to not having information for synchronous evaluation, the web request is redirected to display a gateway page while asynchronous obtaining information from an external information provider server, the request tracked with a request identifier and storing the asynchronously gathered information for synchronous access along with the request identifier.

In another embodiment, responsive to an automated notification from the web browser extension, the web request is reissued to the web browser by the gateway page to replace the gateway page with response content from the web request. The reissued web request is again intercepted by the web browser extension to synchronously evaluate the gathered information. The reissued web request is then based on the fetched information.

Advantageously, computer performance is improved with better handling of web requests from browsers.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for evaluating web requests in an extension of a web browser using asynchronous information services, prior to dispatching the web requests for a network device.

I. Systems for Asynchronous Information Services in Synchronous Web Browsers (FIGS. 1-2)

Figure 1A:
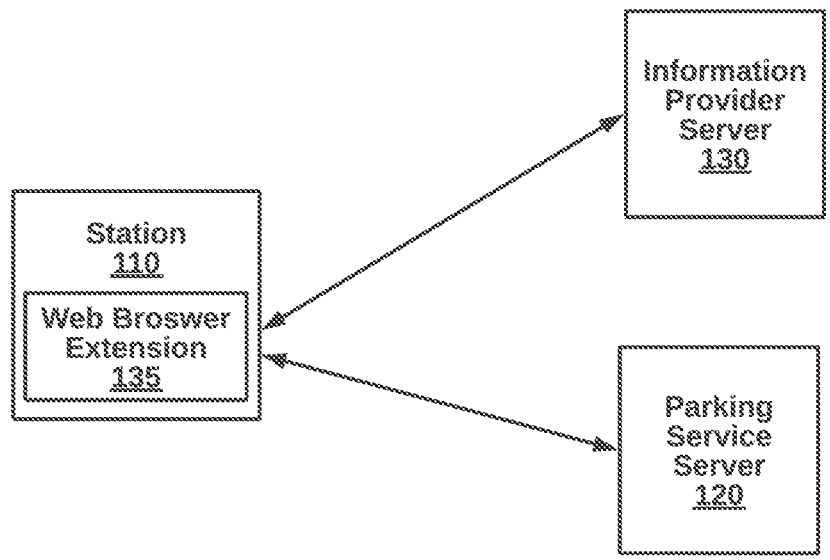
FIGS. 1A and 1B is a high-level block diagram illustrating systems having a web browser extension for evaluating web requests using a gateway page to make asynchronous information synchronously available, prior to dispatching the web requests, according to some embodiments.
Figure 1B:
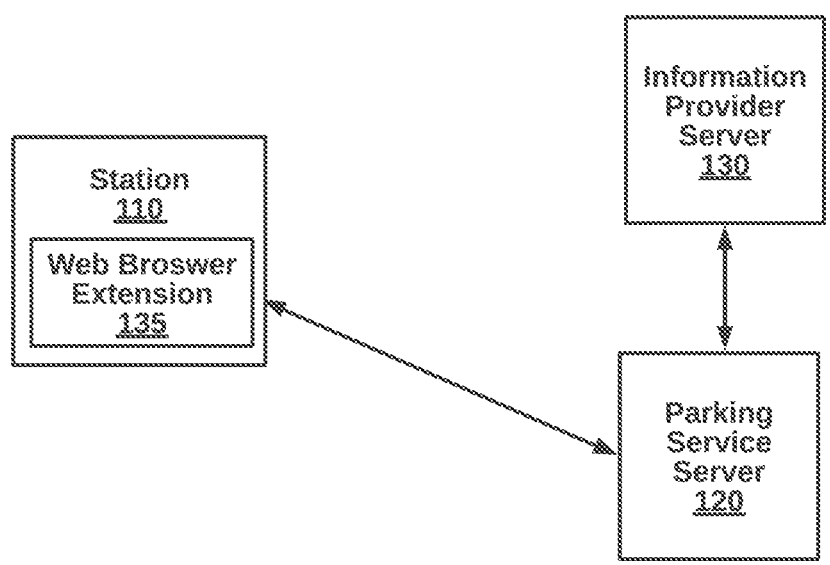
Figure 1C:
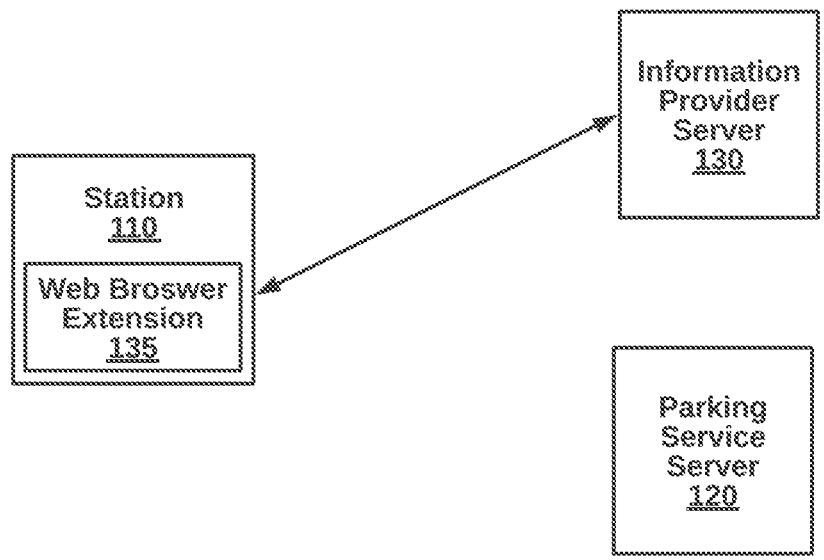
FIG. 1C is a high-level block diagram illustrating system for a web browser having a web browser extension for evaluating web requests using internal coordination to make asynchronous information synchronously available, prior to dispatching the web requests, according to one embodiment.
Figure 2:
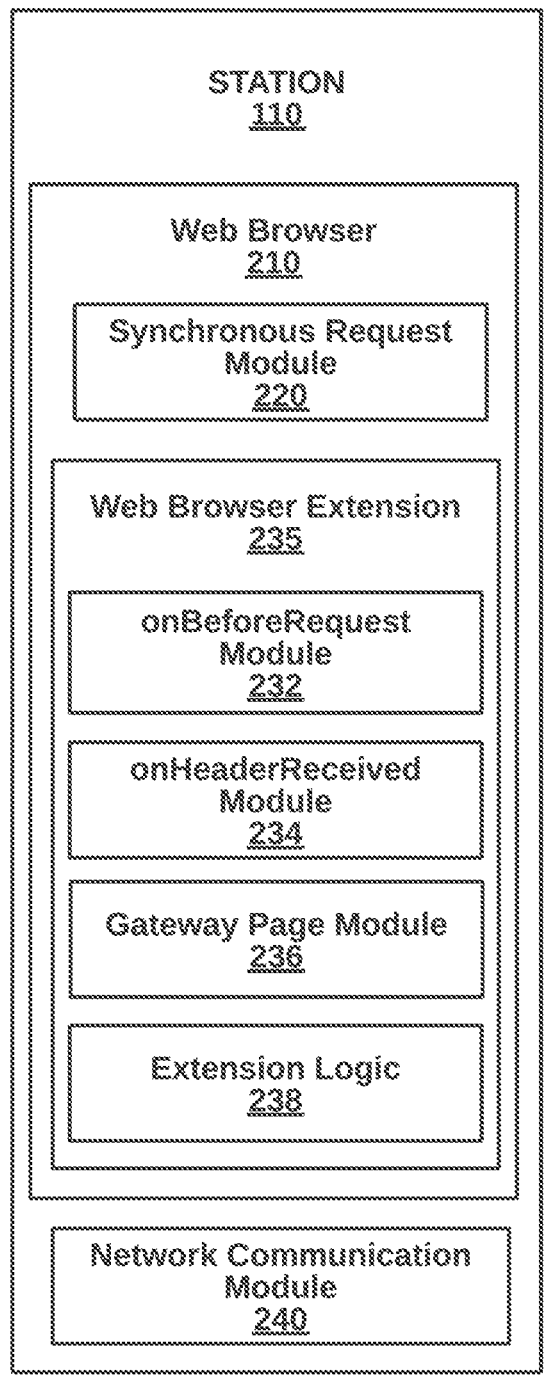
FIG. 2 is a more detailed block diagram illustrating a network device manager of the system of FIG. 1, according to one embodiment.
Figure 6:
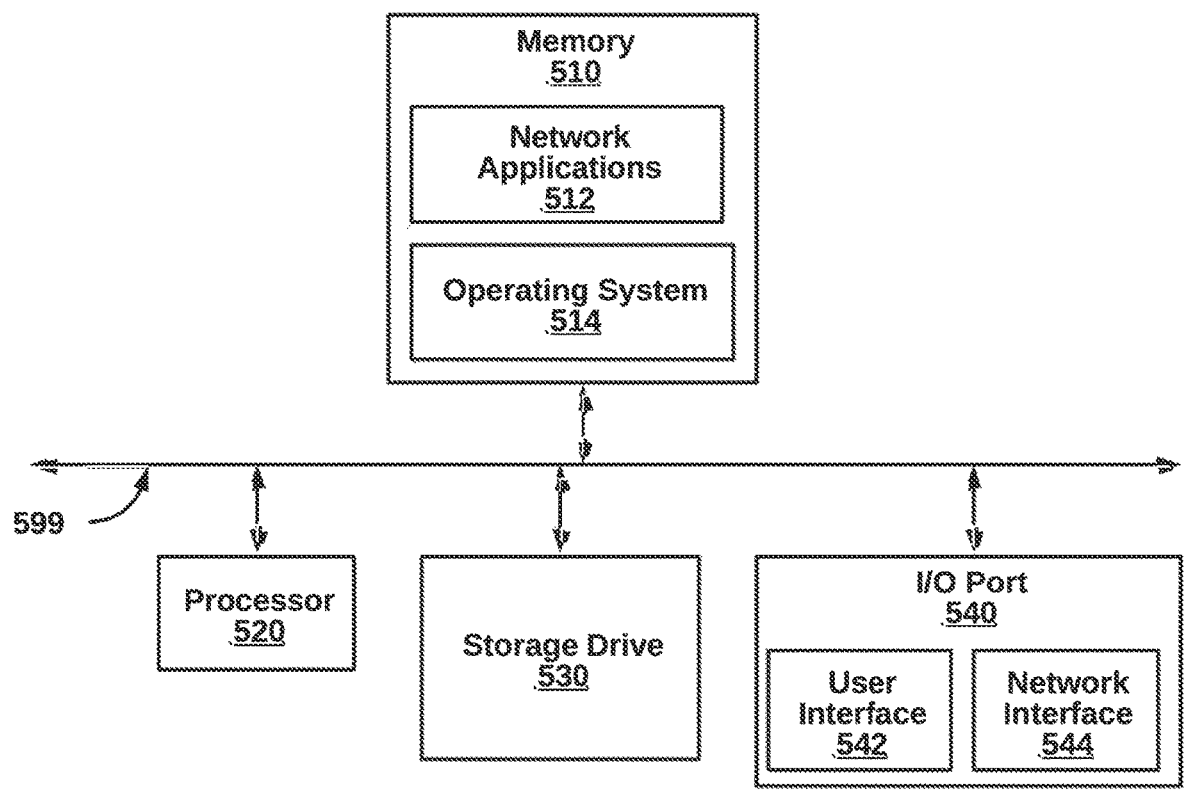
FIG. 6 is a block diagram illustrating an example computing device for the system of FIG. 1, according to one embodiment.

FIGS. 1A and 1B is a high-level block diagram illustrating a system 100 for a web browser extension 135 using a parking service to make asynchronous information synchronously available, prior to dispatching a web request according to an embodiment. By contrast, FIG. 1C shows a web browser having an extension for evaluating web requests by using internal coordination to make asynchronous information synchronously available, prior to dispatching the web requests, according to one embodiment. The system 100 includes a station 110, a parking server 120 and an information service 130. In some cases, the parking server 120 is integrated with the information server 130. Other embodiments of the system 100 can include additional components that are not shown in FIGS. 1A and 1B, such as controllers, network gateways, firewalls, access points and stations. In FIG. 1A, the station 110 uses the parking server 120 which in turn contacts the information server 130, while in FIG. 1B, the station 110 directly contacts the information server 130 in parallel with the parking server 120, and a FIG. 1C, the parking server 120 is excluded from the data process. The components of system 100 can be implemented in hardware, software, or a combination of both. An example implementation is shown in FIG. 6.

In one embodiment, the components of the system 100 is coupled in communication over a private network connected to a public network, such as the Internet. In another embodiment, system 100 is an isolated, private network. The components can be connected to the data communication system via hard wire (e.g., access points). The components can also be connected via wireless networking (e.g., stations). The data communication network can be composed of any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use IPV4 or IPV6 address spaces.

The web browser 210 depends on redirecting requests to a gateway page, which holds on responding until the extension fetches the required information. Web requests can be made by users or processes that are web browsing or using web apps. When a request is dispatched, the browser notifies the onBeforeRequest module 212 as an event handler. The handler evaluates if the information needed to evaluate a request is available. If the information is available, the event handler is able to immediately return a decision of whether to allow, block, or redirect a request.

If the information is not available, the event handler redirects the request to the gateway page. The gateway page can be, as displayed, just a blank page or a colored background. An icon, such as a sand timer or loading up bar, can also be shown. The gateway page can be hosted by web browser extensions and once loaded, will wait for a trigger for navigation to the original request. A mobile gateway page can be the same as PC or IoT gateway pages in some cases and can be customized by device in other cases.

In the meantime, asynchronous information is requested from an external information provider, such as a phishing website database. When the information has been made available to the web browser 212, gateway page reissues the request. Information gathering can be associated with an identifier to track responses. The web browser extension 135 then dispatches the request to the original URL by the gateway page. At such point, the browser invokes the onBeforeRequest module 212 event again with the original URL. This time, however, the information is guaranteed to be present and the event handler can immediately provide a decision. This process is further detailed in FIGS. 5A-5D.

FIG. 2 is a more detailed block diagram illustrating the station 110 of the system of FIGS. 1A-1C, according to one embodiment. The station 110 includes a web browser 210 and a network communication module 220. The components can be implemented in hardware, software, or a combination of both.

The web browser 210 further comprises a web requests module 220 to synchronously evaluate web requests, a web browser extension 235 to prepare asynchronous information gathering for the synchronous request module 220, and a display module 240 to show content of web pages. In more detail, the web browser extension 235 includes onBeforeRequest module 232, onHeaderReceived module 234, gateway page module 236 and extension logic 238. The web browser extension 235 can be downloaded and added on to a conventional browser, such as Google Chrome or Microsoft Edge. In other cases, the web browser extension 235 can be incorporated into an operating system or other application. When the web browser 210 is opened on desktop or mobile device, extensions may be loaded afterwards albeit transparent to users. In one example, the web browser 210 runs on an operating system and the web browser extension 235 runs in a virtual machine on WASM, in isolation of each other. In another example, there can be some dependencies and communication between the operating system and the virtual machine.

In operation, the onBeforeRequest module 232 intercepts web requests to web browser 210 and determines whether information is synchronously available to evaluate the web request. This can be the first event called when a request is dispatched, and events can be cancelled or redirected. Responsive to not having information for synchronous evaluation, the web request is redirected to a gateway page while asynchronously (e.g., remotely) obtaining information needed to evaluate the web request, once reissued. The onHeaderReceived module 234 handles the reissued request to the browser by retrieving the stored information. This event is triggered when all the request headers have been received, in one example, and cannot cancel the event but can redirect the event. In some embodiments, an onErrorOccurred event is triggered when an event fails. It does not allow for redirecting, modifying or cancelling reuqests.

The synchronous request module 220 synchronously evaluates the reissued web request, and determines whether to allow, redirect or block, because relevant information is now synchronously available. For example, when a URL corresponds to a phishing web site, the request can be blocked. If allowed, the evaluated web request can be dispatched from the web browser 210 to an HTTP server.

The parking service server 120 can be an HTTP (and HTTPS) route where web requests are redirected when information is not available. Preferably, the present disclosure avoids the direct need for the parking server 120 by independently coordinating information gathering. In one embodiment, the parking server 120 can be used for some circumstances and the holding page for other circumstances. For instance, if a parking server has deteriorating performance, a switch can be made to holding pages. On the other hand, if a large number of holding pages is too computer intensive, some or all can be off-loaded back to parking servers.

Figure 1D:
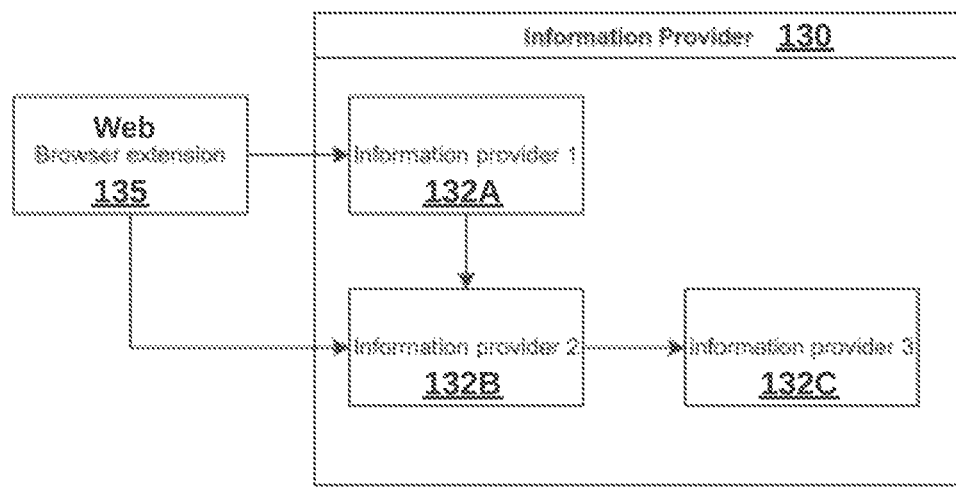
FIG. 1D is a high-level block diagram illustrating an information provider network, according to an embodiment.

The information provider server 130 can include an API for providing information to evaluate requests. This information is timely provided to the parking service server 120 prior to releasing the request. In some embodiments, the information provider server 130 is a proxy for other information services. In another embodiment, the information provider server 130, as shown in FIG. 1D, includes a network of information providers 112A-C. In this case, the information provider server 130 acts as a proxy for another upstream information provider.

In one embodiment, techniques are described from the point of view of the two most important events in the webRequest API: chrome.webRequest.onBeforeRequest and chrome.webRequest.onHeadersReceived. The first stage is when a request is triggered by the browser. The request is first sent to the chrome.webRequest.onBeforeRequest event. At this time, the extension must first be evaluate if the information needed to process the request is already available. If the information is not available, the request is redirected to the Parking Service for it to be held. Concurrently, an information request to the Information Provider is dispatched. Once the request is redirected, it will enter the chrome.webRequest.onBeforeRequest again. This time, the request is recognized as a hold request and is allowed to proceed.

Note, that at this stage a unique request identifier (RI) can be generated. The RI is used to let the different parts of the system know when they receive some message, to which request the message refers. The RI is preferably be small and concise enough so that it is able to be encoded into an URL, as this is the only means through which it can be transmitted. This is due to the fact that when redirecting from the chrome.webRequest.onBeforeRequest event, the extension is not able to specify the request headers, or a request body. In the extension, RI is stored in a map, where related value will contain state information about the ongoing request such as the evaluation information. The RI is also encoded and embedded into the hold URL using, for example, the URL query parameters. This way, the extension is able to solicit the Parking Service to release the request at a later time using the same RI. The RI generated from a combination of fields such as the request URL, the requestId, the tabId, frameId, etc.

The second stage is the handling of the evaluation information. At this point, the Information Provider has returned the information to the extension. This could be via a WebSocket, for example. Alternatively, in the Parking-Service-controlled architecture, the information can also be returned to the extension via the response headers of the hold request. The important fact is that the information must be stored in a map that relates the RI to the evaluation information, so that it can be accessed when needed. At this time, the possibility that the Information Provider is not available must be handled. After this step is done, issue the release request is issued to the Parking Service. Again, in the Parking-Service-controlled architecture, this is redundant, as the Parking Service is implicitly aware of the moment that the extension has received the information.

The third stage is the redirection from the hold request back to the original request URL. After the hold request is released, the next event to activate is the chrome.webRequest.onHeadersReceived. This event is triggered once the response headers are available for both the user requests, hold requests, or other whitelisted URLs (i.e., a proprietary block page). For this reason, the first step is to discern which type of request is currently being handled. In the case that a request triggered by the user is being handled, the assumption can be made that the request has already been processed, and dispatched to complete. After the first step, it must be evaluated if the evaluation information is indeed available. One possible cause of this is a premature release of the hold request. In such case we must issue an error, the manner of which is not relevant. After the verification, the hold request can be redirected back to the original request.

The fourth stage, is the enforcement of the evaluation of the original request. After the hold request is redirected back to the original request, the next event to become active is the chrome.webRequest.onBeforeRequest. At this time, the extension is guaranteed to have the necessary information to process the original request. Thanks to this fact, it can be instantly decided whether to allow the request by, block it, or redirect to any other URL, as needed. After allowing or redirecting the request, once again it enters the chrome.webRequest.onHeadersReceived, the processing of which has been outlined in the previous stage.

II. Methods for a Web Browser Extension (FIGS. 3-5)

Figure 3:
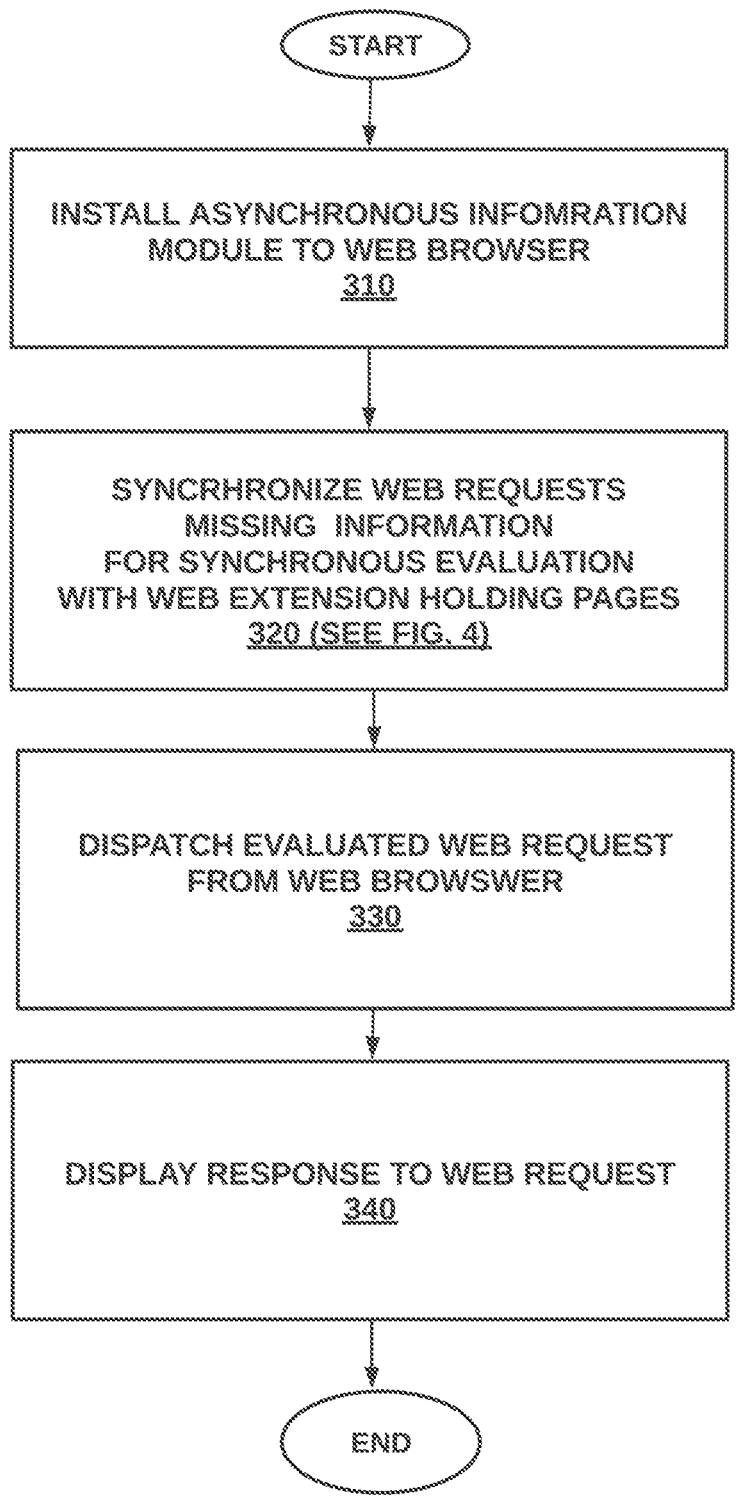
FIG. 3 is a high-level flow diagram illustrating a method for a web browser having an extension for evaluating web requests using internal coordination to make asynchronous information synchronously available, prior to dispatching the web requests, according to an embodiment.

FIG. 3 is a high-level flow diagram of a method 300 for evaluating web requests in an extension of a web browser using asynchronous information services, prior to dispatching the web requests for a network device, in an embodiment. The method 300 can be implemented by, for example, system 100 of FIG. 1. The specific grouping of functionalities and order of steps are a mere example as many other variations of method 300 are possible, within the spirit of the present disclosure.

At step 310, a web browser extension is installed to intercept web requests to a web browser. At step 320, web requests are held by the gateway page in order to retrieve missing information needed for synchronous evaluation by the web browser or the web browser extension until synchronous evaluation is ready, as described below in reference to FIG. 4, and throughout the disclosure.

Figure 4:
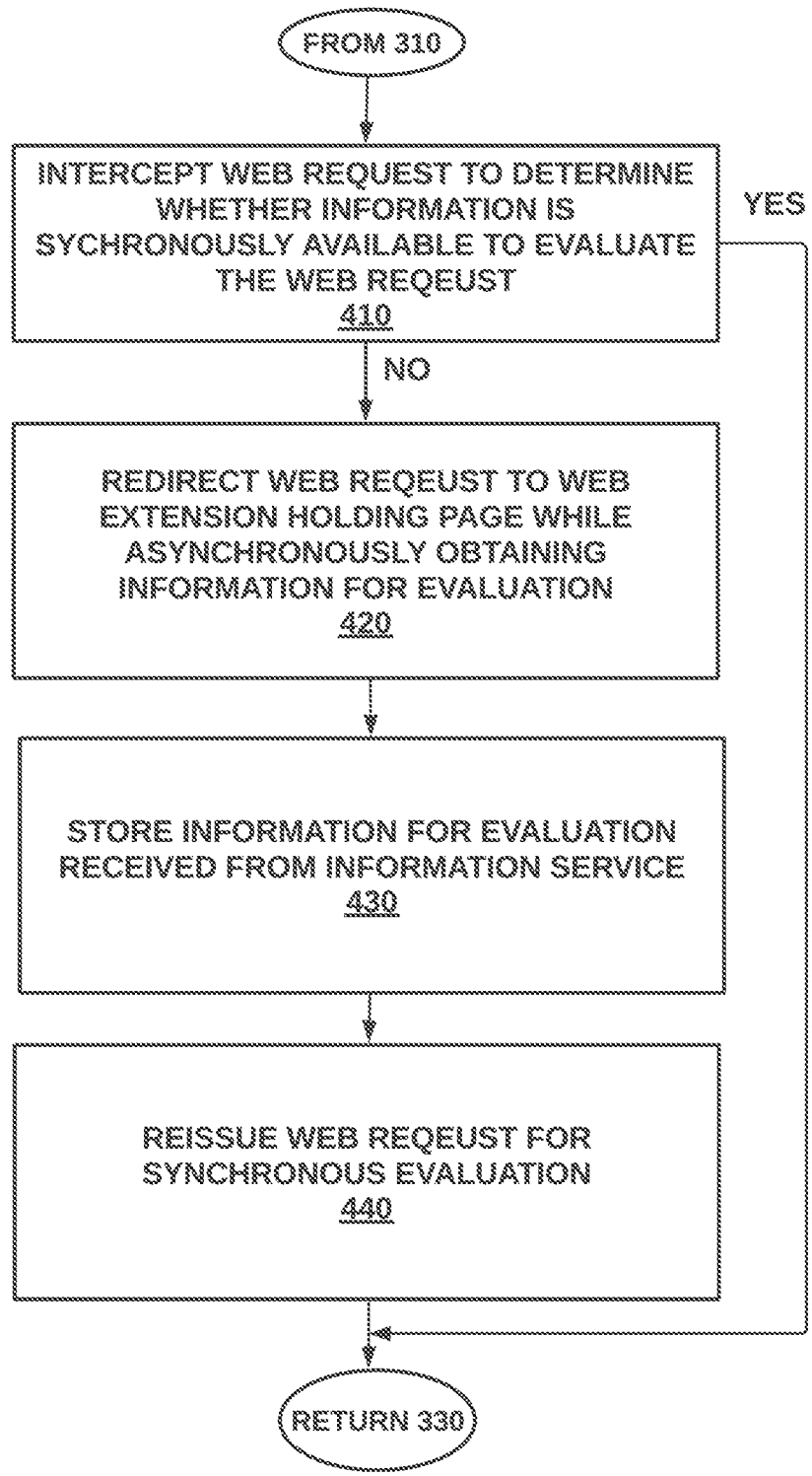
FIG. 4 is a more detailed flow diagram illustrating a step for synchronizing web requests missing information needed for synchronous evaluation, from the method of FIG. 3, according to one embodiment.
Figure 5A:
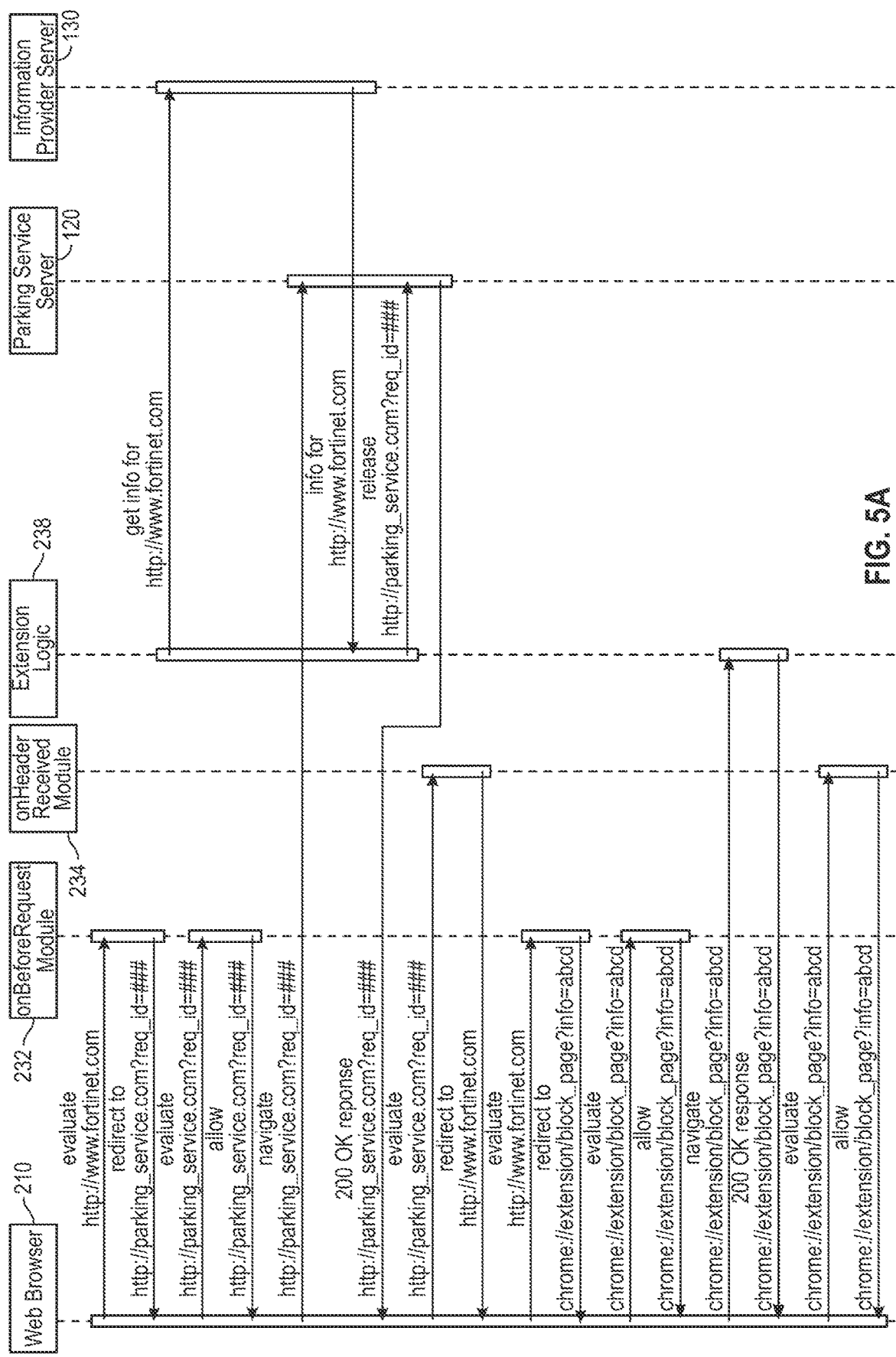
FIGS. 5A-5D are sequence diagrams illustrating interactions between components for synchronously evaluating web requests with missing information, according to an embodiment.
Figure 5B:
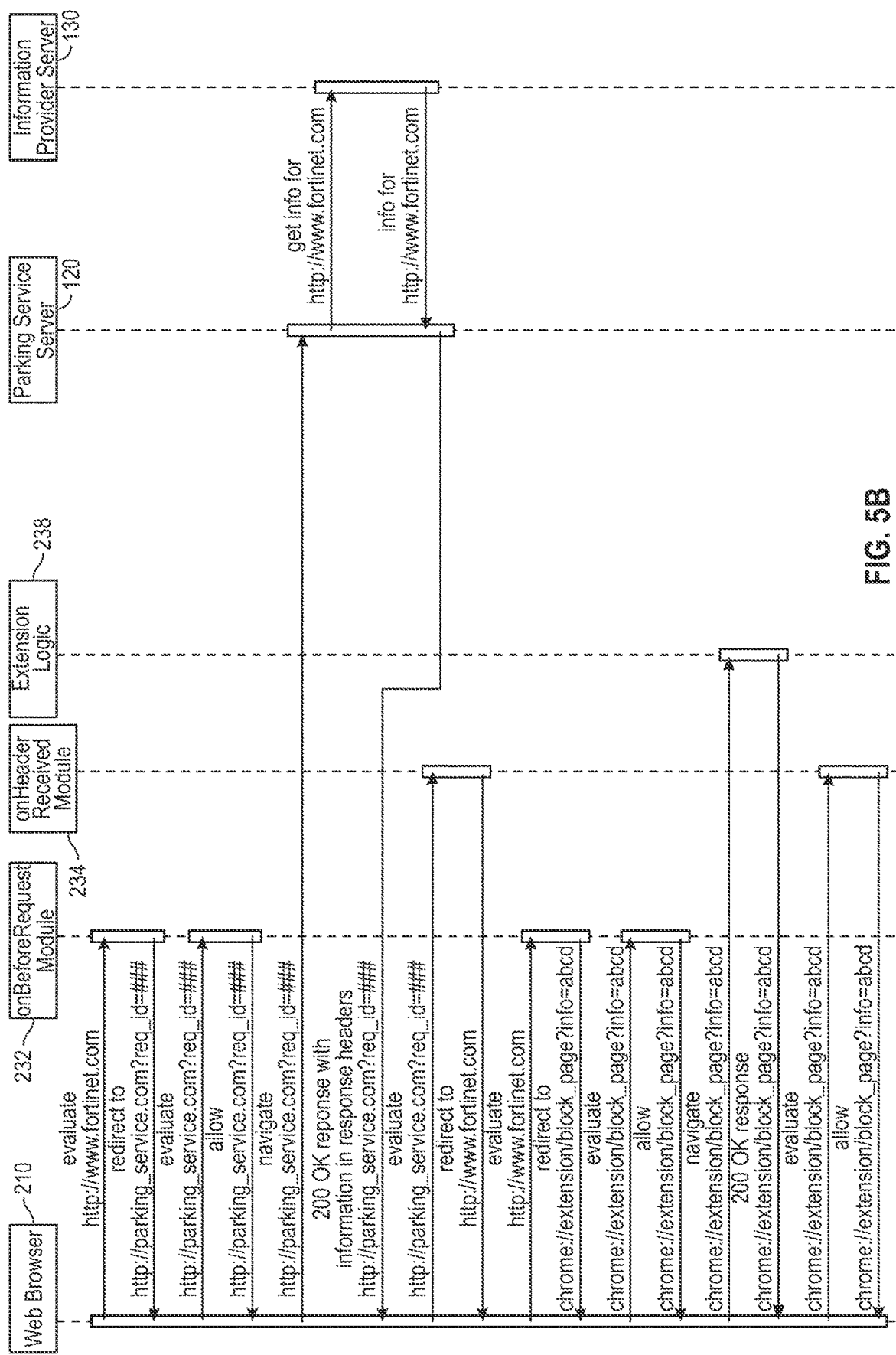
Figure 5C:
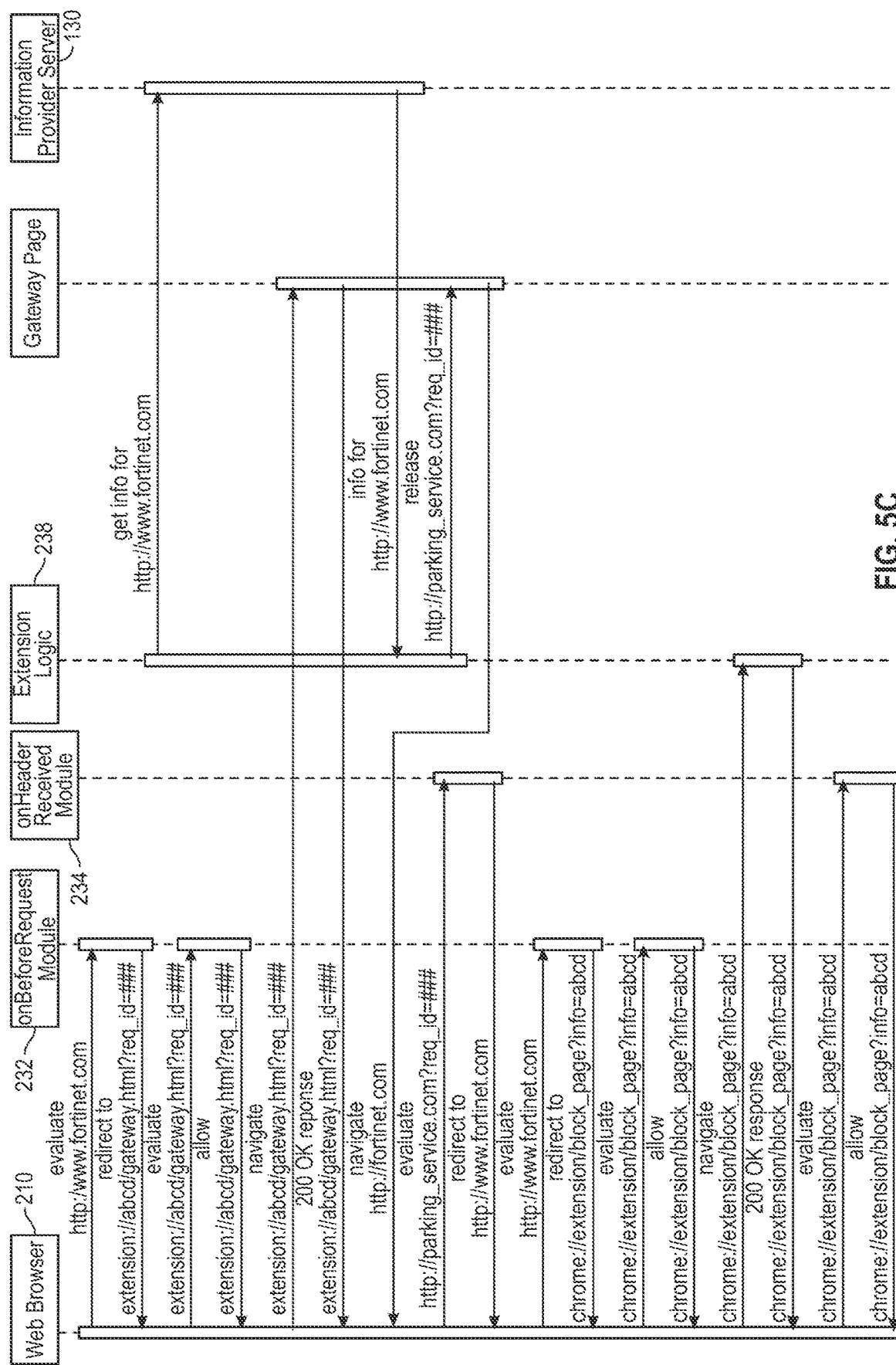
Figure 5D:
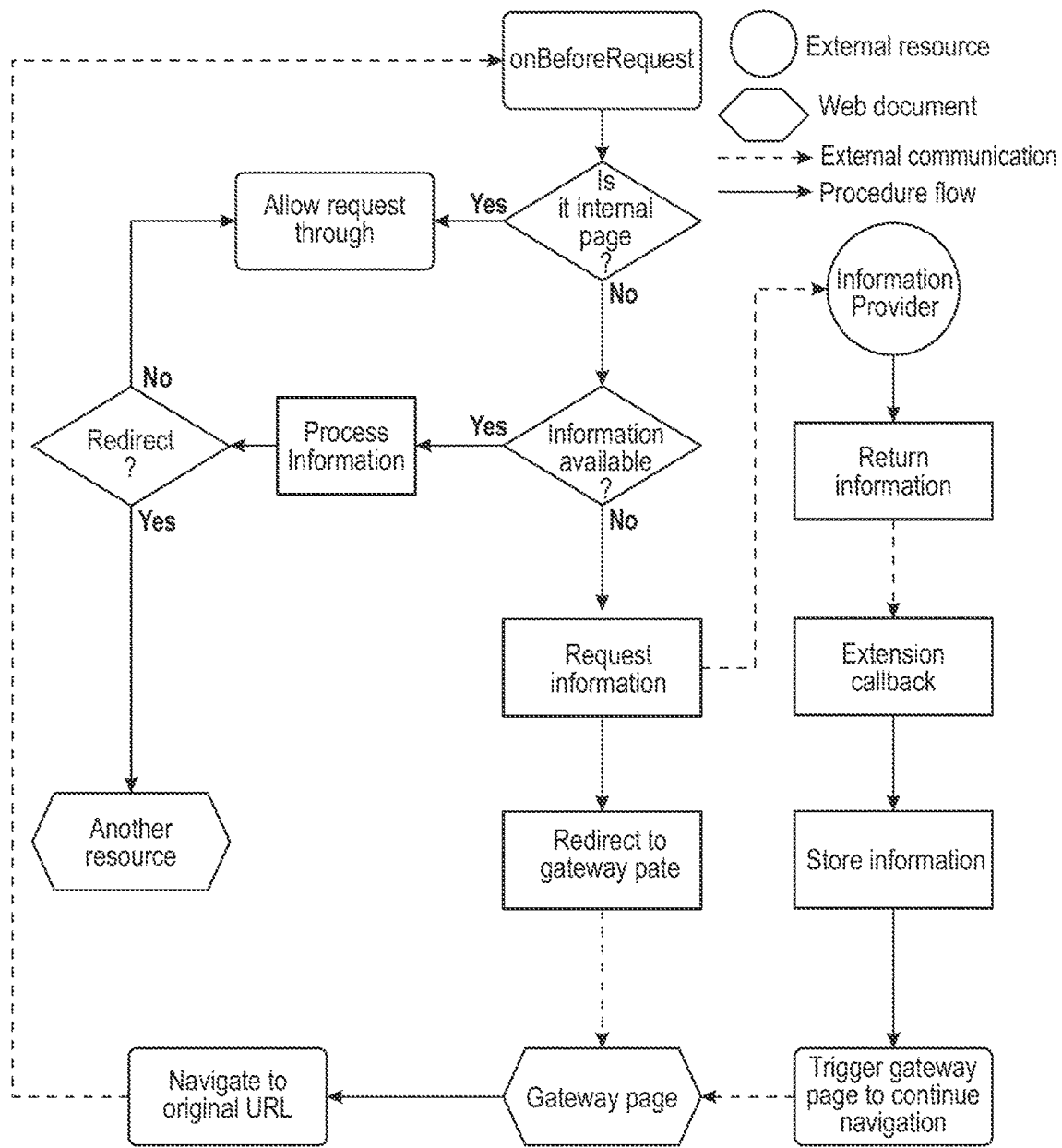

Returning to step 320, more details are shown in FIG. 4. At step 410, intercepting, a web request is intercepted for determining whether information is synchronously (currently) available to evaluate the web request. Responsive to not having information for synchronous evaluation, at step 420, the web request is redirected to display a web extension holding page, while asynchronously obtaining information to evaluate the web request from an information provider server. At step 430, a response from the redirected web request including information for evaluation is received and stored. In more detail, a request identifier of a response to web requests can be matched to a request identifier of the initial web requests. Finally, at step 440, the web request is reissued and synchronously evaluated, using the stored information. More specifically, the web request can be reissued by the web browser holding page for replacing the web browser holding page with content of the stored information.

III. Computing Device for a Web Browser Extension (FIG. 6)

FIG. 6 is a block diagram illustrating a computing device 600 for use in the system 100 of FIG. 1, according to one embodiment. The computing device 600 is a non-limiting example device for implementing each of the components of the system 100, including the station 110, the parking server 120 and the information server 130. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer ⅔ routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

I claim:

1. A computer-implemented method in a network device with a web browser having an extension for evaluating web requests using internal coordination to make asynchronous information synchronously available, prior to dispatching the web requests, the method comprising:

installing the web browser extension to intercept web requests for a URL to a browser;

intercepting, by the web browser extension, a web request to the web browser and determining whether information is synchronously available to evaluate the web request;

responsive to not having information for synchronous evaluation, redirecting, by the web extension, the web request to display a gateway page while asynchronously obtaining information from an external information provider server, the request tracked with a request identifier and storing the asynchronously gathered information for synchronous access along with the request identifier;

responsive to an automated notification from the web browser extension, reissuing the web request to the web browser by the gateway page to replace the gateway page with response content from the web request;

intercepting, by the browser extension, the reissued web request to synchronously evaluate the gathered information;

evaluating the reissued web request based on the fetched information;

and determining a location of a parking service, wherein the location of the parking service is dynamic.

2. The method of claim 1, wherein the information evaluated is real-time information.

3. The method of claim 1, wherein the web request includes a URL.

4. The method of claim 1, wherein responsive to having the information for synchronous evaluation, synchronously evaluating, the browser, the web request.

5. The method of claim 1, wherein the evaluating step comprises evaluating the reissued web request based on the fetched information, wherein a result of the evaluation comprises at least on of: redirect, ignore, cancel, change request header, and change response header.

6. The method of claim 1, wherein the evaluated web request is either allowed, blocked or redirect the web request, responsive to evaluation results.

7. The method of claim 1, wherein the external information provider server comprises a database of phishing web sites.

8. The method of claim 1, wherein responsive to having information for synchronous evaluation, redirecting, by the web extension, the web request to display a web page to bypass the browser extension holding page.

9. A non-transitory computer-readable medium in a network device with a web browser having an extension for evaluating web requests using asynchronous information services, prior to dispatching the web requests, the method comprising:

installing the web browser extension to intercept web requests for a URL to a browser; intercepting, by the web browser extension, a web request to the web browser and determining whether information is synchronously available to evaluate the web request;

responsive to not having information for synchronous evaluation, redirecting, by the web extension, the web request to display a gateway page while requesting asynchronous information from an external information provider server, the request tracked with a request identifier and storing the asynchronously gathered information for synchronous access along with the request identifier;

responsive to an automated notification from the web browser extension, reissuing the web request to the web browser by the gateway page to replace the gateway page with response content from the web request; intercepting, by the web browser extension, the reissued web request to synchronously evaluate gathered information; evaluating the reissued web request based on the fetched information;

and determining a location of a parking service, wherein the location of the parking service is dynamic.

10. A network device with a web browser having an extension for evaluating web requests using asynchronous information services, prior to dispatching the web requests, the network device comprising:

a processor;

a network interface communicatively coupled to the processor and to a data communication network; and a memory, communicatively coupled to the processor and storing: an operating system module, installing a web browser extension to intercept web requests for a URL to a browser;

an onBeforeRequest module intercepting, by the asynchronous information module, a web request and determining whether information is synchronously available to evaluate the web request;

a gateway page module to, responsive to not having information for synchronous evaluation, redirecting, by the asynchronous information module, the web request to display a gateway page while asynchronously obtaining information from an external information provider server, the web request tracked with a request identifier, wherein the gateway page module stores the asynchronously gathered information for synchronous access along with the request identifier, wherein the gateway page module replaces the gateway page with response content from the web request, wherein the gateway page module intercepts the reissued web request to synchronously evaluate the gathered information, wherein the onBeforeRequest module evaluates the reissued web request based on the fetched information; and determining a location of a parking service, wherein the location of the parking service is dynamic.

* * * * *